(12) United States Patent
Tytgat

(10) Patent No.: US 8,977,075 B2
(45) Date of Patent: Mar. 10, 2015

(54) METHOD FOR DETERMINING THE RELATIVE POSITION OF A FIRST AND A SECOND IMAGING DEVICE AND DEVICES THEREFORE

(75) Inventor: Donny Tytgat, Ghent (BE)

(73) Assignee: Alcatel Lucent, Boulogne-Billancourt (FR)

( * ) Notice: Subject to any disclaimer, the term of this patent is extended or adjusted under 35 U.S.C. 154(b) by 790 days.

(21) Appl. No.: 13/257,028

(22) PCT Filed: Mar. 12, 2010

(86) PCT No.: PCT/EP2010/053217
§ 371 (c)(1),
(2), (4) Date: Sep. 16, 2011

(87) PCT Pub. No.: WO2010/112320
PCT Pub. Date: Oct. 7, 2010

(65) Prior Publication Data
US 2012/0007943 A1    Jan. 12, 2012

(30) Foreign Application Priority Data

Mar. 31, 2009   (EP) .................................... 09305274

(51) Int. Cl.
| G06K 9/32 | (2006.01) |
| G01C 11/06 | (2006.01) |
| G01B 11/03 | (2006.01) |
| G01B 11/22 | (2006.01) |
| G06T 7/00 | (2006.01) |

(52) U.S. Cl.
CPC ............... *G01C 11/06* (2013.01); *G01B 11/03* (2013.01); *G01B 11/22* (2013.01); *G06T 7/004* (2013.01); *G06T 2207/10028* (2013.01)
USPC .......................................... 382/294; 382/154

(58) Field of Classification Search
None
See application file for complete search history.

(56) References Cited

U.S. PATENT DOCUMENTS

| 5,699,444 | A | * | 12/1997 | Palm ............................. 382/106 |
| 6,501,537 | B1 | * | 12/2002 | Chahl et al. .................. 356/3.14 |
| 6,668,082 | B1 | | 12/2003 | Davison |
| 6,690,451 | B1 | * | 2/2004 | Schubert ...................... 356/3.14 |
| 6,789,039 | B1 | * | 9/2004 | Krumm .......................... 702/150 |
| 8,107,677 | B2 | * | 1/2012 | Angell et al. ................. 382/103 |
| 8,244,027 | B2 | * | 8/2012 | Takahashi ..................... 382/154 |
| 8,605,987 | B2 | * | 12/2013 | Chao et al. .................... 382/154 |
| 2002/0041327 | A1 | * | 4/2002 | Hildreth et al. ................. 348/42 |
| 2004/0233461 | A1 | | 11/2004 | Armstrong |
| 2006/0221072 | A1 | * | 10/2006 | Se et al. ........................ 345/420 |

FOREIGN PATENT DOCUMENTS

| EP | 0964223 | 12/1999 |
| JP | H11351865 | 12/1999 |
| KR | 10-0891549 | 4/2009 |
| WO | 0213513 | 2/2002 |

* cited by examiner

*Primary Examiner* — Jayesh A Patel
(74) *Attorney, Agent, or Firm* — Carmen Patti Law Group, LLC

(57) ABSTRACT

A method for determining the relative position and orientation of a first and a second imaging device by comparing the image of a commonly depicted object in a first and a second image of the first and the second imaging device respectively, wherein the first and the second imaging devices are adapted for providing first and second depth information respectively for the respective images and in which at least the first and the second depth information is used for the determination. Corresponding device are also disclosed.

13 Claims, 8 Drawing Sheets

METHOD FOR DETERMINING THE RELATIVE POSITION OF A FIRST AND A SECOND IMAGING DEVICE AND DEVICES THEREFORE

TECHNICAL FIELD OF THE INVENTION

The present invention relates to the field of camera calibration techniques and devices therefore. It relates to methods and devices for determining the relative position and orientation of a first and a second imaging device and applications thereof.

BACKGROUND OF THE INVENTION

When capturing a scene with two or multiple cameras, the characteristics of these cameras are often needed in order to efficiently use captured data or information, for instance for deriving 3-D information of objects in the scene. These characteristics typically include the location of the cameras, the orientation of the cameras and the internal camera parameters (also called intrinsic parameters) as for instance resolution, field of view, skew, etc. When creating a three-dimensional model of the scene for instance, this information is typically of critical importance. Recovery of the camera information is often called "camera calibration" in the state of the art.

Current solutions use the color information captured by the cameras in order to perform the calibration. Often a calibration step is however required, which requires a calibration object to be physically brought or inserted into the real scene. The known characteristics of the calibration object are then used to recover the camera parameters.

Other solutions exist, which do not require such a calibration object; however, these solutions are slow and/or not reliable. These solutions often have the problem that they comprise a difficult initialization, that they only work on scenes with certain types of features or that they require additional knowledge or information about the scene. These solutions do not allow camera calibration which is transparent to the end user. Furthermore it is difficult to support moving cameras while maintaining camera calibration. State of the art methods do moreover require substantial processing capabilities.

Most of the state of the art technologies do also not allow real time 3-D information extraction.

In the state of the art, techniques exist for deriving 3-D information of real objects, for instance for using this 3-D information of the object for representing the object in a virtual environment, as for instance a virtual world. An example of an existing technique for "translating a real object in 3-D digital information" comprises the scanning of the object by means of one or more lasers.

SUMMARY OF THE INVENTION

When terms as "first", "second", "third" and the like are used, this does not necessarily mean that a sequential or that a chronological order is to be assumed.

The term "comprising", should be interpreted as such that it does not exclude other elements or steps.

According to a first aspect of the present invention a method is disclosed for determining the relative position and orientation of a first and a second imaging device by comparing the image of a commonly depicted object in a first and a second image of the first and the second imaging device respectively, wherein the first and the second imaging devices are adapted for providing first and second depth information respectively for the respective images and in which at least the first and the second depth information is used for the determination.

Embodiments of the present invention employ depth information and data, possibly in addition to color data to optimize the camera calibration process. A depth value is typically available in addition for a color value for every pixel, for cameras which are enabled with this technology. This depth value is a value within a certain range that indicates relative notion of depth. The set of all depth values for an image represents a depth map, which can be acquired by various means known in the state of the art. This can for instance occur by directly capturing the dept data along with the color data (for instance by means of time of flight measurements). Another, more common way for deriving depth data is generating such a depth map out of two (or more) nearby images of a scene. Nearby images can be defined as images with sufficient overlap. Commonly used are cameras that are placed with the image planes in the same plane and where the distances between the camera centers are between 3 and 100 cm. Employing this depth information enables fast camera calibration (location and orientation) without the need of physically handling and bringing calibration objects into the scene, enabling dynamic camera configurations.

According to embodiments of the present invention the method comprises a. determining a set of at least four reference points, the reference points recognizable on the first image and on the second image as projected reference points;
b. deriving the virtual position of the reference points with respect to the first imaging device by using the first depth information for the image of the reference points in the first image;
c. setting a predetermined orientation of the first imaging device;
d. deriving the position of the second imaging device with respect to the virtual reference points by using the second depth information of the image of the reference points in the second image;
e. determining the orientation of the second imaging device by optimizing the alignment between the image of the reference points on the second image and the virtual reference points.

The orientation of the first imaging device can be freely determined as all recovered locations and orientations will be relative to this predetermined orientation (and the position of this first imaging device).

The terminology 'reference points' is used for the 3D representation, and the terminology 'projected reference points (on a certain imaging device)' for their associated 2D representation by an imaging device. Furthermore a distinction can be made between 'real' reference points, and 'virtual' reference points; the first being the actual points in the real world, and the second being the reference points that are back-projected from the imaging device into the virtual 3D space (real and virtual should be equal in a 'perfect' system; i.e. a system without capturing errors). The at least four real reference points can be seen as real points, being points of the real world, that are visible by both the first and the second imaging device. The at least four virtual reference points can be seen as the points that are derived from the projected reference points from an imaging device.

The at least four (projected) reference points can be determined automatically, for instance by automatic image recognition or other state of the art recognition techniques.

Preferably, the at least four virtual reference points are not within the same plane.

According to embodiments of the present invention optimizing the alignment of the image of the reference points on the second image with the reference points comprises:
   a. aligning at least one of the images of the virtual reference points in the second image with its corresponding projected reference point;
   b. determining the angle of rotation around the rotation axis, defined by the line connecting the aligned projected reference point with the imaging device center, necessary in order to have the other of the images of the reference points maximally correspond to their respective virtual reference points.

In the ideal case the other of the images of the virtual reference points can be mapped exactly on the other respective projected reference points. In practice the correspondence may not be perfect, and an optimization or maximization of the correspondence may be performed. Optimization methods can be used for both the retrieval of the location and orientation; the choice of these methods will depend on the expected noise in the images (both 2D and depth) and requested accuracy in the result. One way of optimizing the location retrieval is by using a state of the art energy minimization method on the energy function:

$$E(l_2) = \sum_{(x_{1,i}, x_{2,i}) \in R} dist(proj(x_{1,i}, c_1), sphere(l_2, depth(x_{2,i})))$$

where R is the set of the projected reference points for the two imaging devices; $l_2$ is the location of the center of imaging device two, dist(x,Y) is the function returning the distance between the (3D) point x, and the sphere Y; proj(x,C) is the function returning the projection of projected (2D) point x using camera parameters C; sphere(x,d) is the function returning the sphere with center x and radius d; depth(x) is the function returning the depth of a projected reference point x. Optimization of the orientation can also use similar energy minimization methods. The energy function to be minimized could in this case be:

$$E(r_2) = \sum_{(x_{1,i}, x_{2,i}) \in R} dist(proj^{-1}(proj(x_{1,i}, c_1), cam(i_2, l_2, r_2)), x_{2,i}),$$

where R is the set of the projected reference points for the two imaging devices; $r_2$ is the orientation of the second imaging device, dist(x,y) is the function returning the distance between the (2D) point x, and the (2D) point y; proj(x,C) is the function returning the projection of projected (2D) point x using camera parameters C; $proj^{-1}(x,C)$ is the function returning the back-projection of (3D) point x using camera parameters C; cam(i,l,r) is the function returning the camera parameter set consisting out of intrinsic parameters i, and extrinsic parameters l (location) and r (orientation); $c_1$, $i_2$ and $l_2$ are considered static during this operation.

An alternative to single-camera optimization is multi-camera optimization. In the single-camera optimization that was described before, the errors lie with the non-reference camera. In multi-camera optimization these errors can be distributed over all imaging devices. In this case one still uses a reference camera for the first approximation of the result, and then optimizes the results by adapting both the position of the virtual reference points (within the expected noise margins of the imaging device) and the other imaging devices to converge to a sufficient result. Similar methods as described before can be used in this case (cfr. Energy minimization), however the variable parameters can be extended to all involved imaging devices (excluding the reference imaging device) and the virtual reference points. The choice of using this multi-camera optimization depends on the expected noise in the input data, and the required precision of the calibration results. In a certain view, the reference camera keeps its initial location and orientation; however the virtual reference points coming from this camera are not regarded as 'the only correct solution'. The coordinates of these virtual reference points are also taken as variables, able to be moved within a certain threshold (depending on the camera noise). Optimization in this case requires determining the camera location/orientation of the non-reference camera's, and the virtual reference points. As such the errors will also be present with the reference camera (because of the moving virtual reference points); the goal of the minimization can be to equally distribute an as-small-as-possible error to all imaging devices.

Other methods for solving the maximization problem are known to the skilled person.

The decomposition of the retrieval process of the relative positioning of two or more imaging devices into two sub-processes of deriving their relative positioning, and determining their relative orientation, allows an efficient and low processing capacity consuming and thus relatively quick determination of the relative positioning of imaging devices with respect to each other.

According to embodiments of the present invention the method further comprises taking into account intrinsic camera parameters in the determination of the position and orientation of the two or more imaging devices.

According to a further aspect of the present invention, the method for determining the relative position and orientation of more than two imaging devices, can be performed by iteratively determining the relative position and orientation of a further imaging device with respect to each other, for instance by determining iteratively the relative position of a further imaging device with respect to a predetermined first imaging device. The aforementioned multi-camera calibration obfuscates the notion of a reference image and allows treating the different imaging devices on an equal basis with regards to the expected noise.

According to an aspect of the present invention a method is disclosed for deriving 3-D information (as position, orientation, size, ... ) of at least one object in a scene, comprising:
   a. providing at least 2 images of the scene, both images comprising the object, the images taken at different positions and orientations with respect to the object;
   b. deriving the relative position of the imaging devices with respect to each other, by means of a method according to embodiments of the first aspect of the present invention;
   c. deriving 3-D information of the at least one object by taking into account the relative position and orientation of the at least 2 imaging devices.

3-D information comprises (but is not limited to) the 3-D location of points that were visible in the 2-D inputs. Other information that can be part of the 3-D information is the orientation of the surface at the 3-D points (frequently called "normals"), color information (textures etc.), etc.

According to embodiments of the present invention the 3-D information of the at least one object is time dependent. In other words, the 3-D information can be determined in real time, allowing the identification of movement and possibly changes of morphology of the object which is imaged by the at least two imaging devices, even when the imaging devices themselves are changing position and/or orientation according to certain embodiments.

In other embodiments the relative position and orientation of the imaging devices can be determined initially and can thereafter be kept constant or invariable. These embodiments further reduce the necessary processing power for the determination of real-time 3-D object information.

The method can be used for translating (capturing) a real object into 3-D object information for use in a virtual environment.

The method according to embodiments of the present invention can be used for retrieving the fixed position and orientation of a predetermined number of imaging devices, the images of which are further used for 3-D video conferencing.

3-D video conferencing can comprise simple stereoscopic video (using 2 cameras at the input to capture 2 video streams, and stereo glasses for example at the output side to show the scene in stereo). It can comprise providing a virtual environment that is the conference room (which is not necessarily a pure virtual representation of an actual conference room) with representations of the different attendees in 3-D. Because of this 3-D information, one is not restricted by one specific viewing angle of these attendees.

According to a second aspect of the present invention a device is disclosed which is adapted for determining the relative position and orientation of a first and a second imaging device by comparing the image of a commonly depicted object in a first and a second image of the first and the second imaging device respectively, wherein the first and the second imaging devices are adapted for providing first and second depth information respectively for the respective images and in which at least the first and the second depth information is used for the determination.

The device can comprise:
a. a means for determining a set of at least four reference points, the reference points recognizable on the first image and on the second image;
b. a means for deriving the position of the reference points with respect to the first imaging device by using the first depth information for the image of the reference points in the first image;
c. a means for determining a plausible orientation of the first imaging device;
d. a means for deriving the position of the second imaging device with respect to the reference points by using the second depth information of the image of the reference points in the second image;
e. a means for determining the orientation of the second imaging device by optimizing the alignment between the image of the reference points on the second image and the reference points.

The device can further comprise a means for taking into account intrinsic camera parameters in the determination.

According to embodiments of the present invention the device comprises a means for determining the relative position and orientation of more than two imaging devices, by iteratively determining the relative position and orientation of a further imaging device with respect to each other, for instance by determining iteratively the relative position of a further imaging device with respect to a first predetermined imaging device.

Further aspects of the present invention are described by the dependent claims. The features from the dependent claims, features of any of the independent claims and any features of other dependent claims may be combined as considered appropriate to the person of ordinary skill, and not only in the particular combinations as defined by the claims.

BRIEF DESCRIPTION OF THE DRAWINGS

The accompanying drawings are used to illustrate embodiments of the present invention.

Reference signs are chosen such that they are the same for similar or equal elements or features in different figures or drawings.

DESCRIPTION OF ILLUSTRATIVE EMBODIMENTS

The above and other advantageous features and objects of the invention will become more apparent and the invention will be better understood from the following detailed description when read in conjunction with the respective figures.

The description of aspects of the present invention is performed by means of particular embodiments and with reference to certain figures but the invention is not limited thereto. Depicted figures are only schematic and should not be considered as limiting. E.g. certain elements or features may be shown out of proportion or out of scale with respect to other elements.

In the description of certain embodiments according to the present invention, various features are sometimes grouped together in a single embodiment, figure, or description thereof for the purpose of aiding in the understanding of one or more of the various inventive aspects. This is not to be interpreted as if all features of the group are necessarily present to solve a particular problem. Inventive aspects may lie in less than all features of such a group of features present in the description of a particular embodiment.

Figure 1:
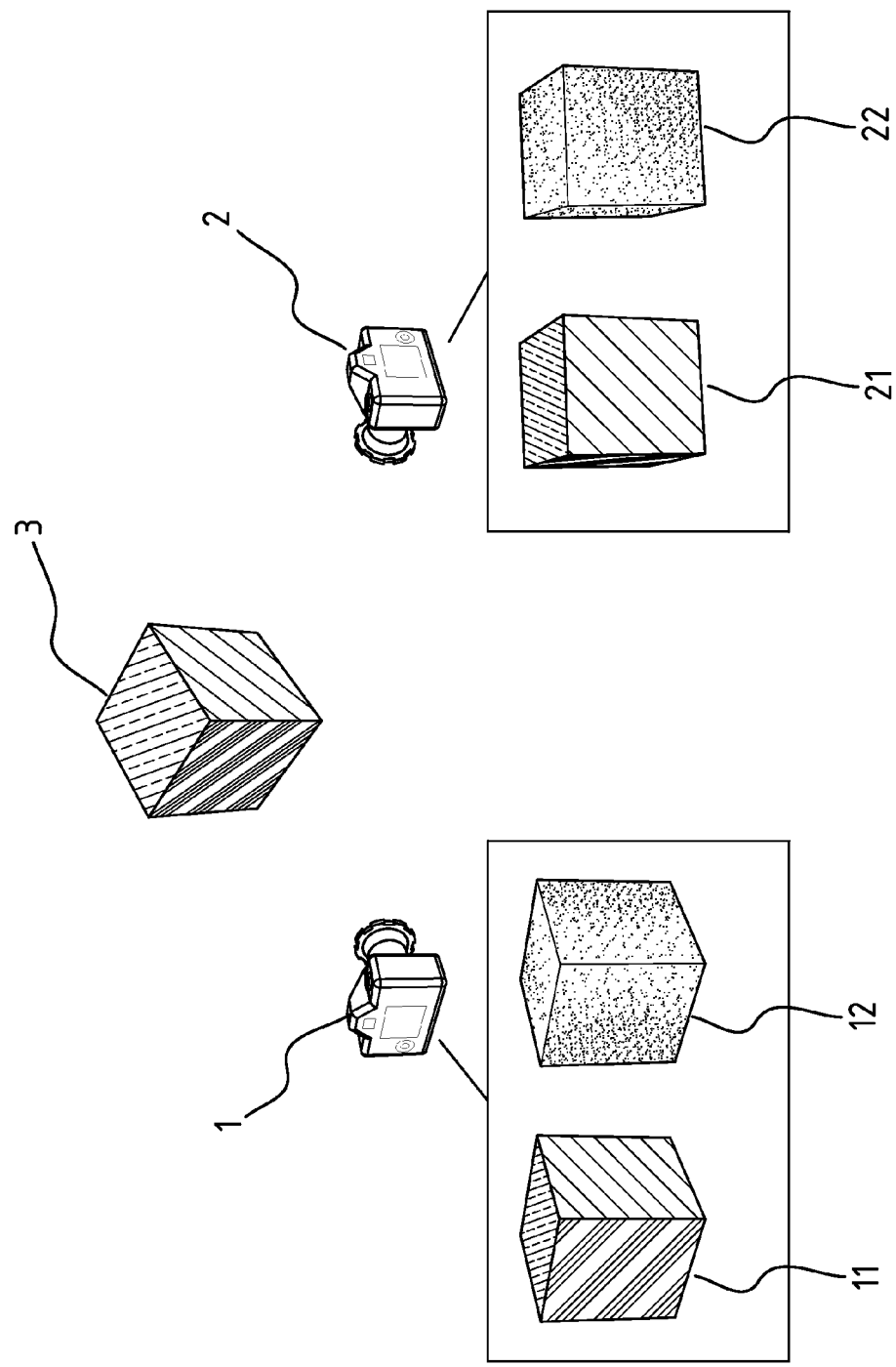
FIGS. 1, 2, 3, 4 and 5 illustrate embodiments according to the present invention.

Embodiments of the present invention (illustrated in FIG. 1) enable calibration of depth-enabled cameras (1, 2) (cameras that provide both color- (11, 21) and depth data (12, 22)) when a scene (comprising an object (3)) is captured using multiple of these cameras with known intrinsic parameters. The calibration process can for instance handle two cameras at a time (remark that when using the multi-camera optimization as described before this is not restricted to two cameras). The relative position of the cameras (imaging devices) can be determined for every pair of cameras of the multitude (at least two) of cameras.

Figure 2:
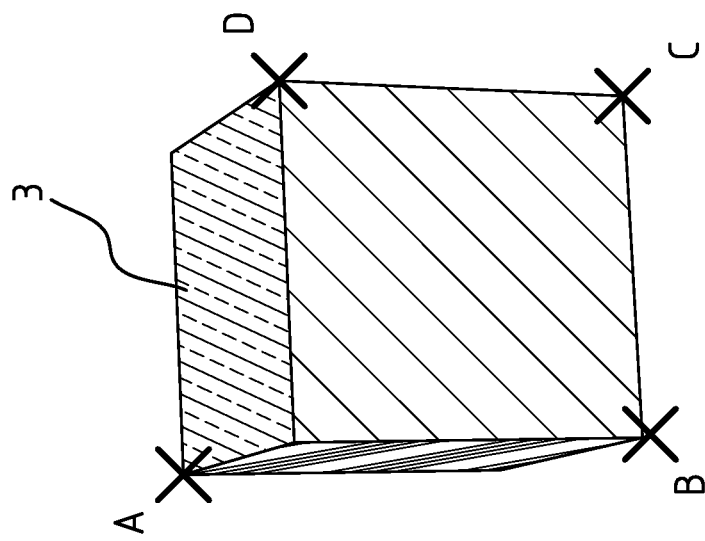
Figure 2:
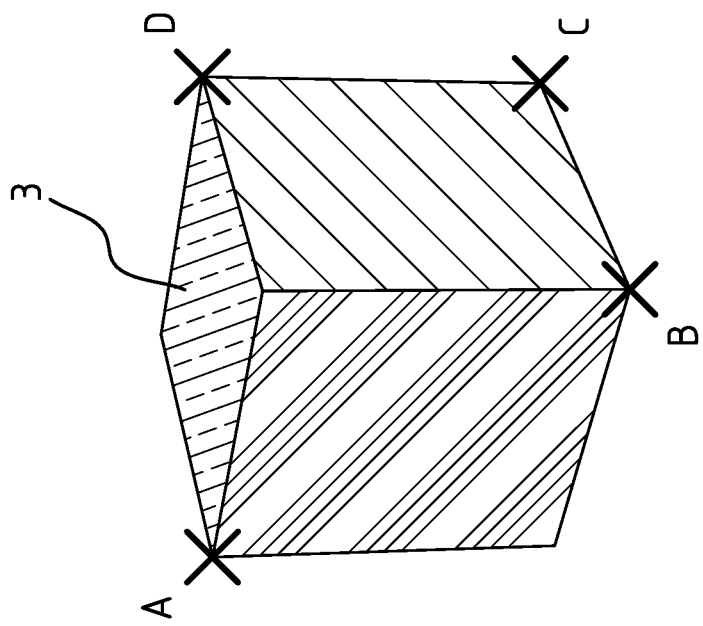

First of all a number of feature correspondences are needed; these feature correspondences are points in the 2-D camera views of the scene that represent the same 3-D scene point. This is illustrated in FIG. 2. At least four such feature correspondences (A, B, C, D) are needed, of which at most three may lie in the same 3-D plane (this can for instance be determined by examining the depth maps). Based on the computational capabilities of the system combined with the real-time requirements, more or fewer feature correspondences can be selected. The most reliable correspondences can preferably be selected (the ones that are most certain). Methods for identifying such correspondences are known to the skilled person.

Once the correspondences for two of the cameras are available, the calibration process can continue. First the first camera (1) can be put at a certain location in space, and it is given a predetermined rotation. It provides a reference for positioning the other camera(s) in space. The retrieved location- and orientation (e.g. rotation) properties of the second camera (2) can preferably be relative to the location- and rotation of the first camera (1).

Figure 3:
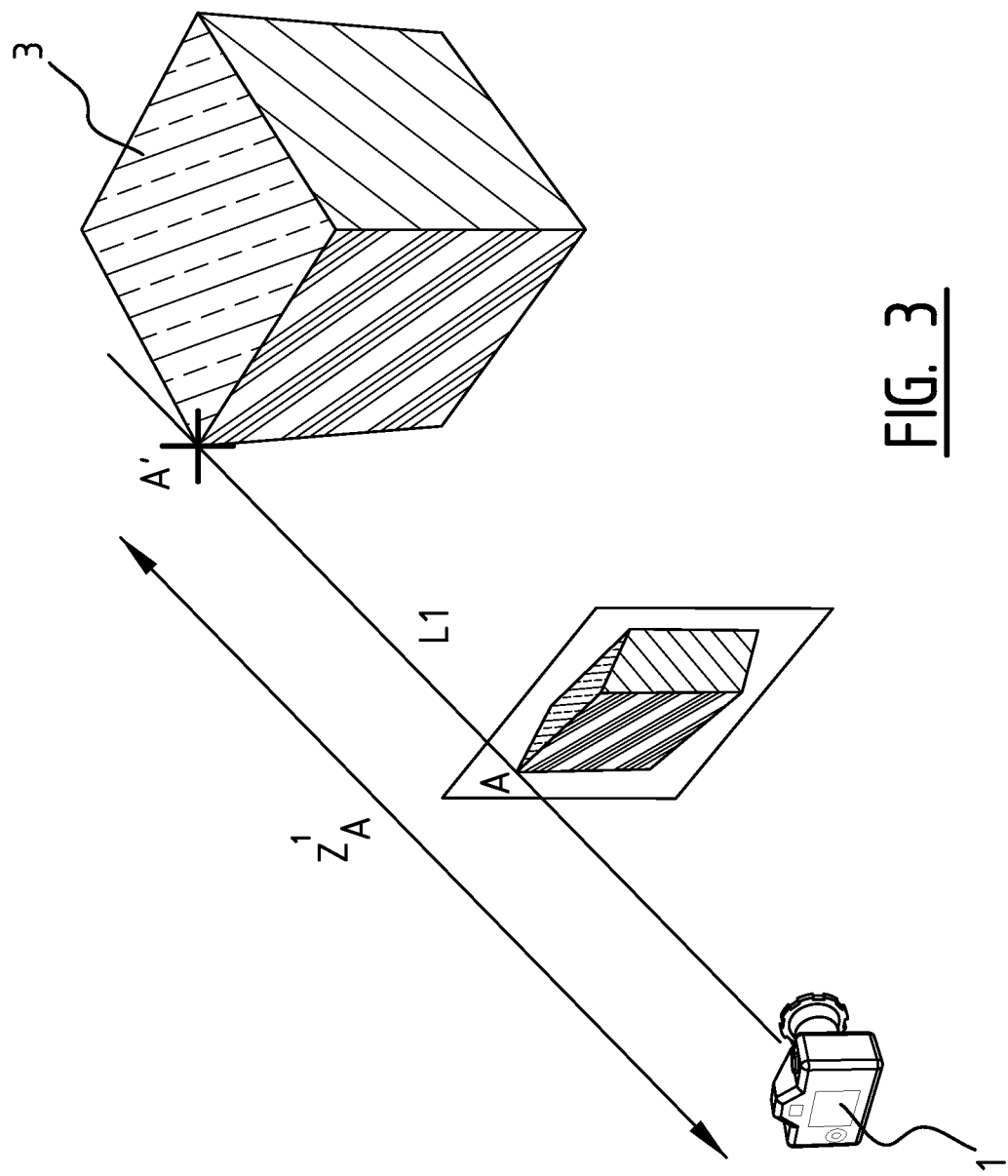

By fixing the location and orientation of the first camera (1), one can back-project the reference points (A, B, C, D) on the image plane of this camera into 3-D space. This is done by first specifying a line (L1) in 3-D space using the camera information (location, orientation and intrinsic parameters) and the 2-D location of the reference point (A). Then the depth information ($Z^1_A$) for the relevant feature point (A) is used, specifying a point (A') on the aforementioned line (L1). This is illustrated in FIG. 3; L1 indicated the line in 3-D space, A' indicates the point on this line defined by the depth information $Z^1_A$ (depth generally indicated with Z).

This can be repeated for all reference points A, B, C, D, resulting in 3-D reference points A', B', C', D' via $Z^1_A$, $Z^1_B$, $Z^1_C$, $Z^1_D$.

Figure 4:
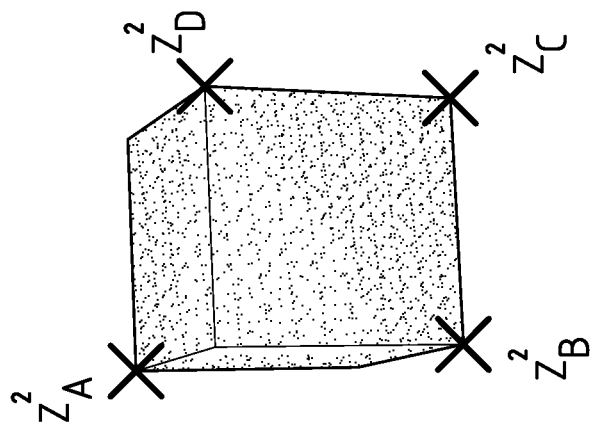
Figure 4:
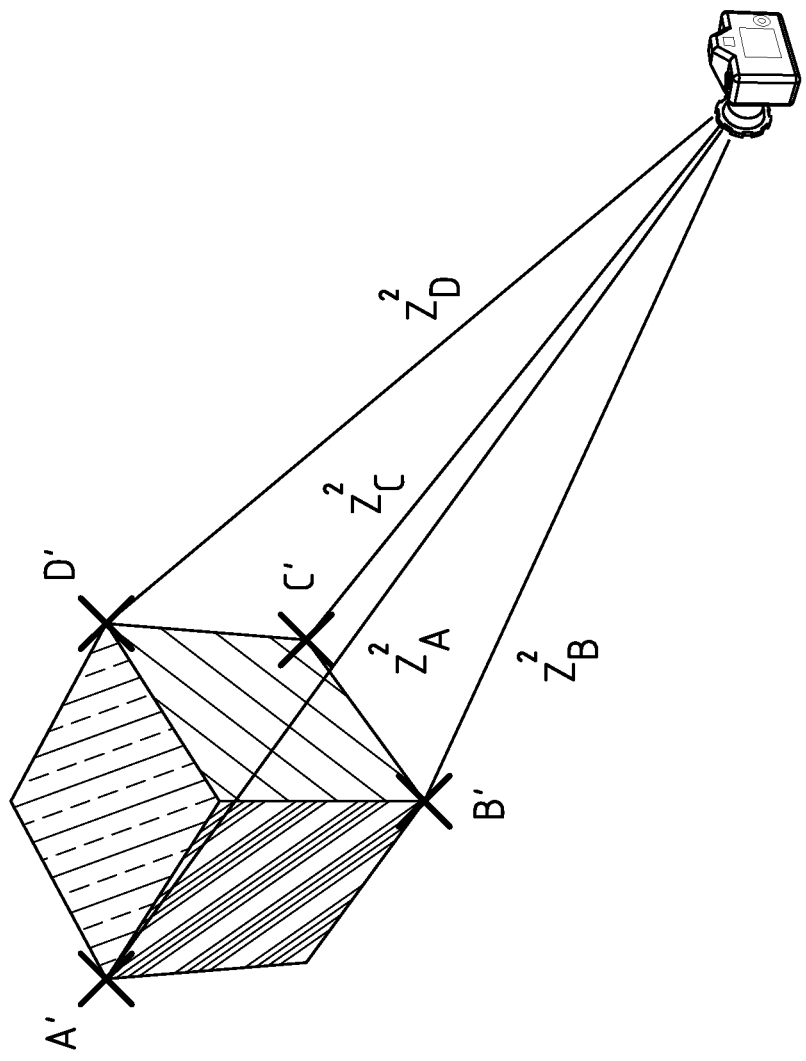

Retrieving the location of the second camera (2) (for instance the location of the pinhole in the known pinhole camera model) can be achieved by determining the location in 3-D space that corresponds best to the depth of every corresponding reference point (A', B', C', D') when seen from the second camera (the depth map of the second camera (2) defines the depth of every reference point $Z^2_A, Z^2_B, Z^2_C, Z^2_D$), from the point of view of camera 2). This is illustrated in FIG. 4, where four feature points are available along with their depth (using the depth map of camera 2).

A way of retrieving this camera location when using four reference (or feature) points is by explicitly intersecting 4 spheres; every sphere has a reference point in 3-D space as its center (A', B', C', D'), and its radius is equal to the depth as specified by the depth map of the second camera (2) ($Z^2_A, Z^2_B, Z^2_C, Z^2_D$). First 2 spheres are intersected, resulting in a circle. Intersecting this circle with a 3rd sphere results in 2 points. The intersection with sphere 4 selects one of these 2 points as the camera location. When no perfect input data is given, more complicated determination techniques may be applied.

After retrieving the location of the camera (CC), the orientation can be calculated. The required information comprises the reference points (A, B, C, D) that are projected onto the image plane of camera 2 (PA2, PB2, PC2, PD2). The orientation can be determined in order to match the reference points (A', B', C', D') as good as possible (for instance rotate camera around its pinhole and match the reference point projections (PA2, PB2, PC2, PD2) with the feature point locations on the given camera image plane (A, B, C, D).

Figure 5:
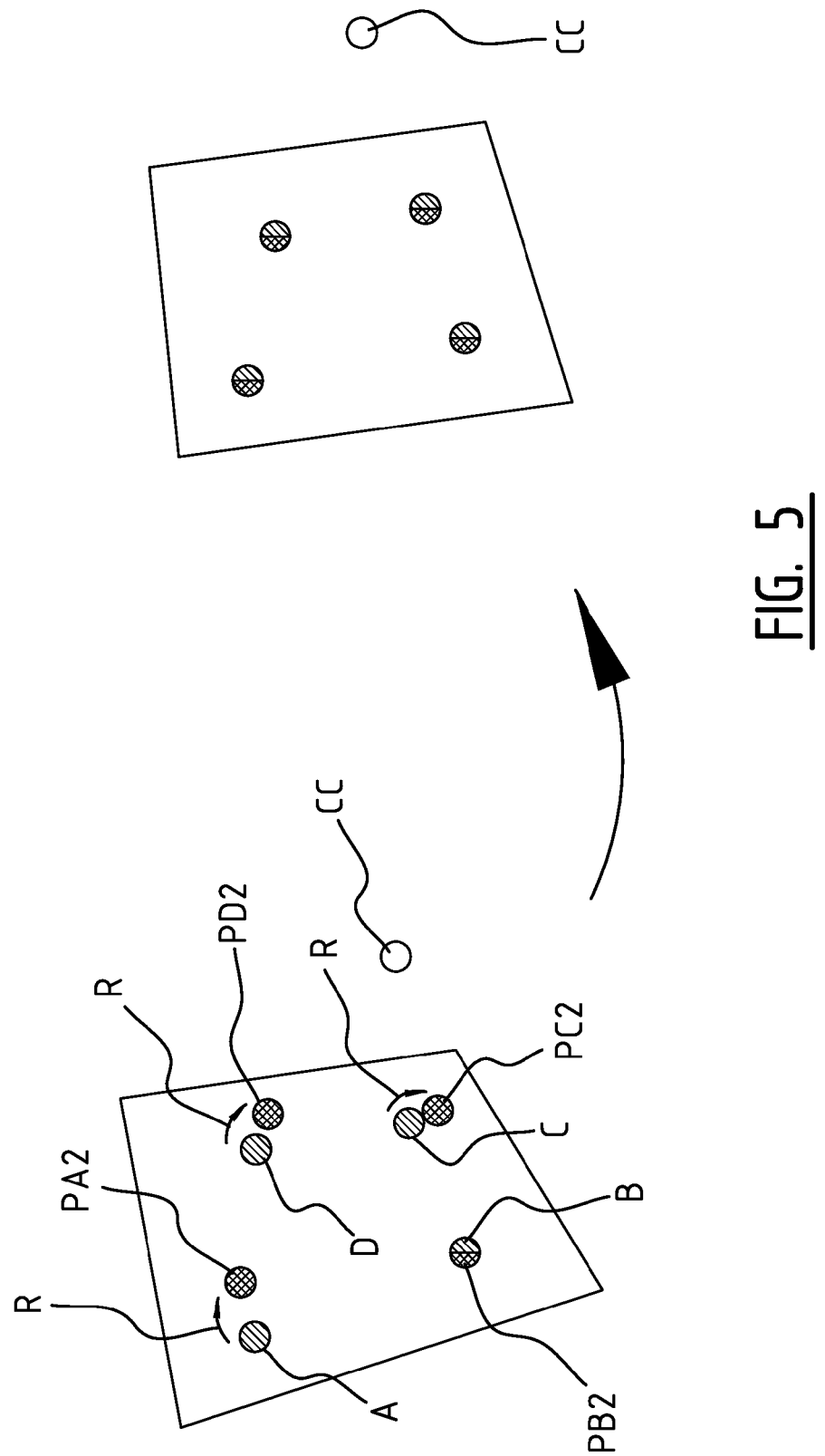

One way for solving this starts with the selection of one feature point projection (e.g. PB2). The camera is orientated in order to project this feature point to the correct location at the image plane (B). Now a rotation R around the axis defined by the camera center (CC) and the projection of the selected feature point (PB2) is needed in order to match the other projected points onto the image plane of the camera. This is illustrated in FIG. 5. The left image shows the situation where one reference point projection PB2 is matched with the feature point location on the image plane (B). In the right image a rotation of the camera is performed around the aforementioned axis or line in order to match the rest of the reference point projections. The best match, e.g. according to a predetermined metric, is used to recover the orientation of the camera.

Embodiments of the present invention can be used for different applications. Some examples are described next.

Figure 6:
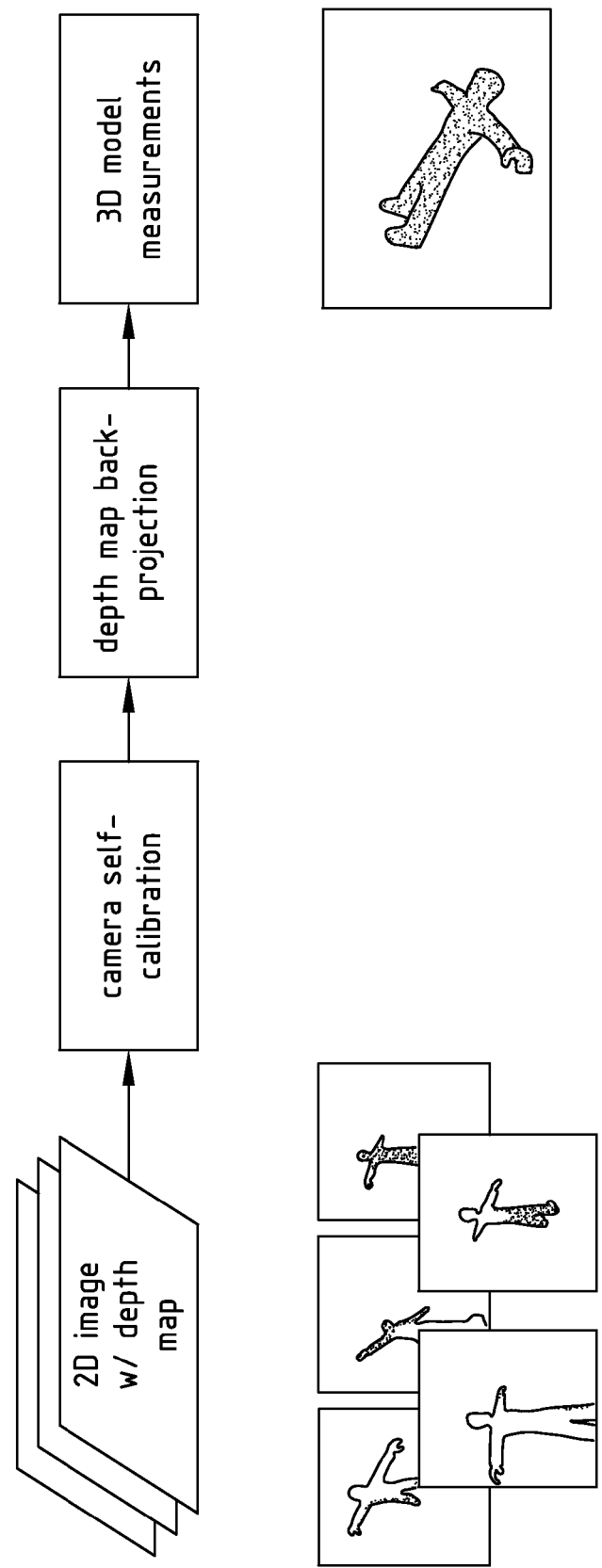
FIG. 6 illustrates embodiments of the present invention within the 3-D geometry synthesis context, whereby 3-D geometry is derived from different 2-D images taken from a common object from different positions and orientations.

Embodiments of the present invention can be part of a home 3-D communication solution (see FIG. 6). A user is recorded by multiple depth-enabled cameras around him (e.g. web cams used 2-by-2 for depth map extraction). The location and orientation of these cameras can then be retrieved using embodiments of the present invention, enabling calibration without the need for an explicit calibration step executed by the user, and allowing movement of one, more or all of the cameras.

Once the calibration information is calculated, the color- and depth information of the multiple cameras can be used for various use-cases; one of them is the creation of a three-dimensional model of the scene. This can be done by carving the multiple depth maps in a voxel space for instance. Such a model can then be integrated in a virtual world, enabling 3-D communication in a virtual environment with real actors (the models of the users).

Figure 7:
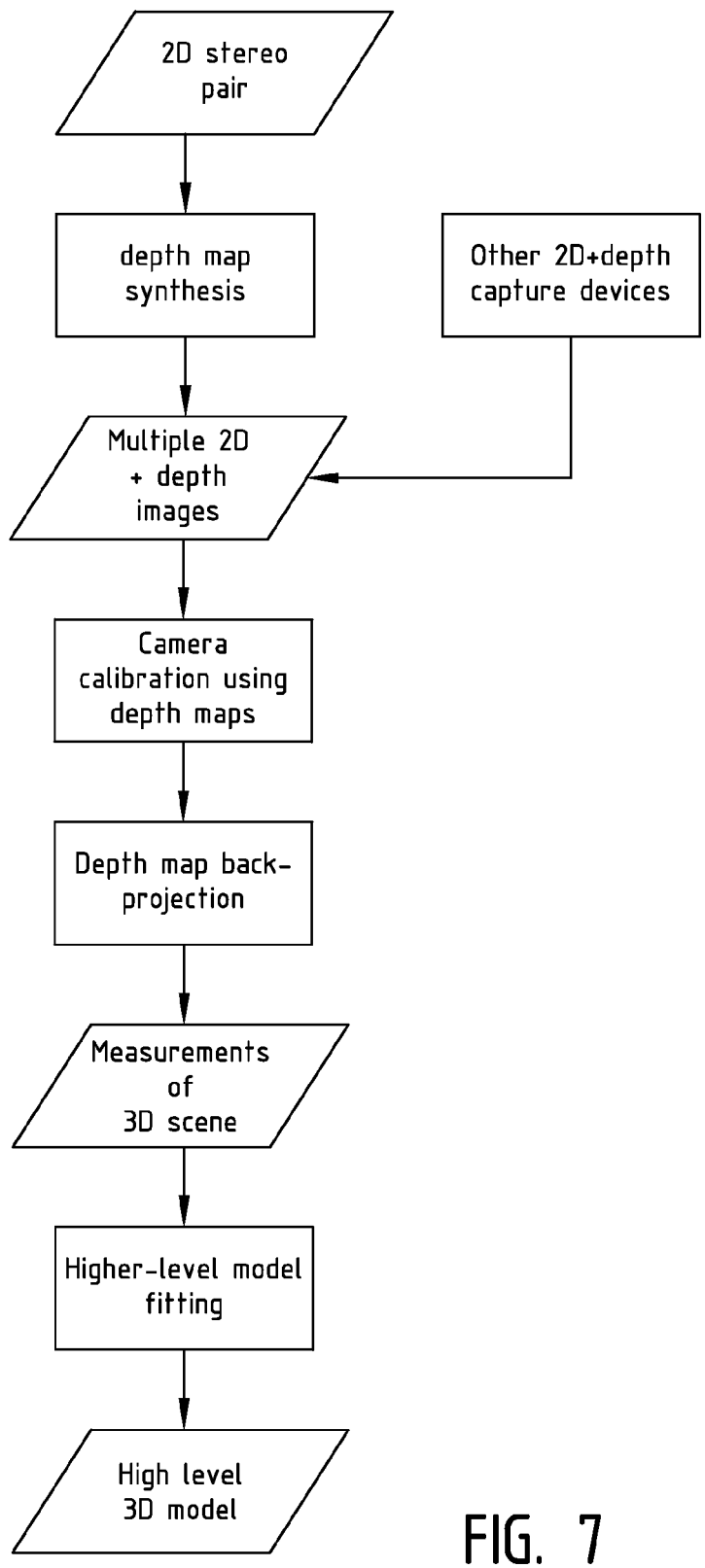
FIG. 7 describes a work flow for 3-D geometry synthesis of real world scenes. The "camera calibration using depth maps" according to embodiments of the present invention can serve perfectly in such methods. The output of embodiments according to the present invention is the location and orientation of the imaging devices (for instance cameras) used.

FIG. 7 describes a work flow for 3-D geometry synthesis of real world scenes. The "camera calibration using depth maps" according to embodiments of the present invention can serve perfectly in such methods. The output of embodiments according to the present invention can be the location and orientation of the imaging devices (for instance cameras) used. This output can then be used to back-project the depth maps of the multiple cameras into 3D space. These measurements can then be used for fitting higher level 3-D models to them; e.g. for polygonal model extraction.

Figure 8:
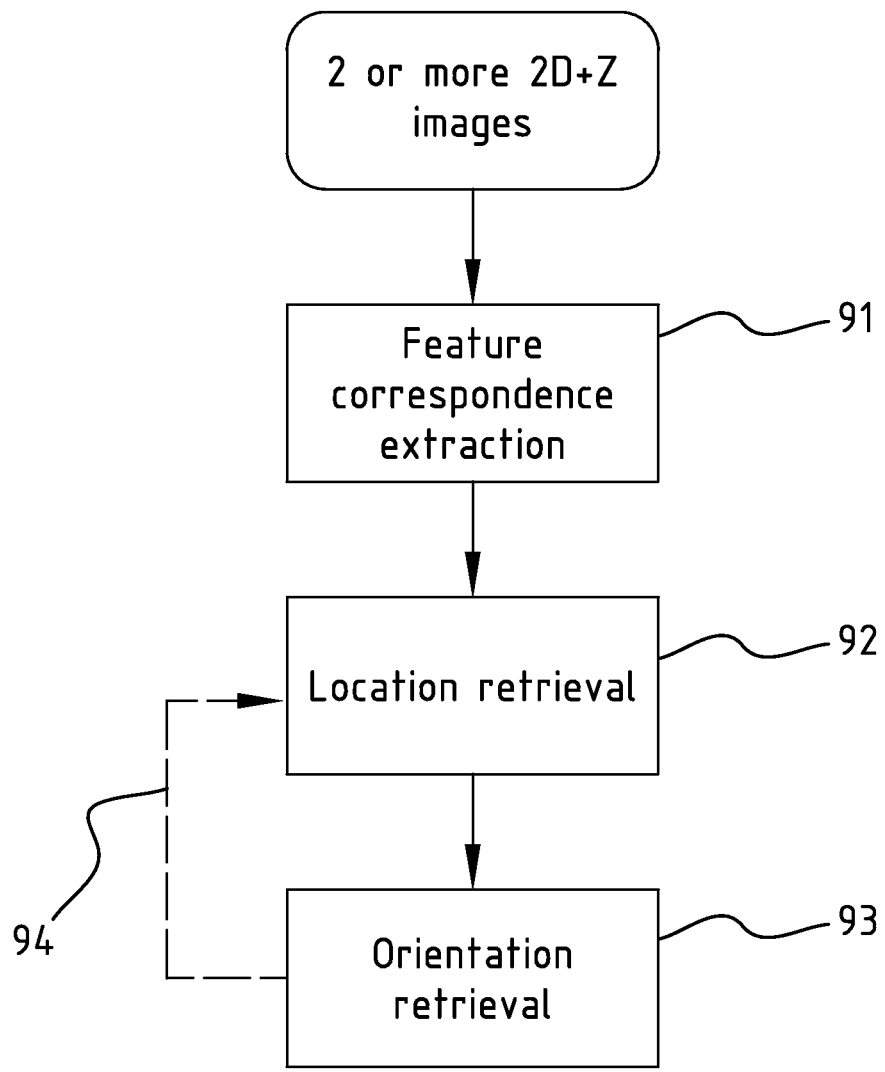
FIG. 8 depicts a possible internal workflow of a possible application based on embodiments according to the present invention.

FIG. 8 depicts a possible internal workflow of a possible application based on embodiments according to the present invention. First, two or more two-dimensional plus depth information images 2-D+Z) are generated or provided. Then feature correspondences are extracted between (at least one) pairs of images (91). Then camera locations are retrieved by minimizing the difference between estimated reference points in 3-D space, and the depth values of the camera views (92). Then camera orientations are retrieved by minimizing the difference between the projected reference points from 3-D space, and the known image coordinates (93). The process may optionally comprise a loop (94) allowing for multiple iterations. These iterations can improve the precision of the end result. The amount of iterations needed depends on the expected noise of the input data, and the required precision in the output.

While some embodiments described herein include some but not other features included in other embodiments, combinations of features of different embodiments are meant to be within the scope of the invention, and form different embodiments, as would be understood by the skilled person.

While the principles of the invention have been set out above in connection with specific embodiments, it is to be clearly understood that this description is merely made by way of example and not as a limitation of the scope of protection which is determined by the appended claims.

The skilled person will appreciate that embodiments of the present invention may provide at least the following advantages:

no need for camera calibration by means of physically handling and bringing into the scene of real calibration object;

relatively low processing capacity required as the decoupling of the relative positioning of different cameras into relative location and relative orientation allows a substantial reduction of necessary processing power;

according to certain embodiments real cameras can be user for deriving 3-D object information, without the need of more complex and/or expensive solutions which may be based on for instance laser scanning;

at least partially caused by the relatively low processing power which is requires, embodiments of the present invention allow for real time 3-D information extraction of moving objects.

The invention claimed is:

1. A method comprising determining a relative position and orientation of a first and a second imaging device by comparing an image of a commonly depicted object in a first and a second image of said first and said second imaging device respectively, wherein said first and said second imaging devices are configured for providing first and second depth information respectively for said respective images and in which at least said first and said second depth information is used for said determination; and
   a. determining a set of at least four reference points, said reference points recognizable on said first image and on said second image as projected reference points;
   b. determining virtual reference points by deriving a virtual position of said reference points with respect to said first imaging device by using said first depth information for the image of said reference points in said first image;
   c. setting a predetermined orientation of said first imaging device;
   d. deriving a position of said second imaging device with respect to said virtual reference points by using said second depth information of the image of said reference points in said second image;
   e. determining the orientation of said second imaging device by optimizing an alignment between the image of said reference points on said second image and the virtual reference points.

2. The method according to claim 1, wherein said at least four reference points are determined automatically.

3. The method according to claim 1, wherein said optimizing the alignment of the image of said reference points on said second image with the reference points comprises:
   a. aligning at least one of said images of said virtual reference points in said second image with its corresponding projected reference point;
   b. determining an angle of rotation around a rotation axis, defined by a line connecting the aligned projected reference point with an imaging device center, necessary in order to have an other of said images of said reference points maximally correspond to their respective virtual reference points.

4. The method according to claim 1, further comprising taking into account intrinsic camera parameters in said determination.

5. The method according to claim 1 further comprising determining a relative position and orientation of more than two imaging devices, by iteratively determining a relative position and orientation of a further imaging device with respect to a predetermined first imaging device.

6. The method according to claim 1, further comprising deriving 3-D information of at least one object in a scene, comprising:
   providing at least two images of said scene, both images comprising said object, said images taken at different positions and orientations with respect to said object; and deriving 3-D information of said at least one object by taking into account said relative position and orientation of at least the first and second imaging device.

7. The method according to claim 6, wherein said 3-D information of said at least one object is time dependent.

8. The method according to any of claim 6, wherein said relative position and orientation of said at least first and second imaging devices is kept constant after initialization.

9. The method according to claim 6, further comprising the translation of a real object into 3-D object information for use in a virtual environment.

10. A system comprising: determining a relative position and orientation of a first and a second imaging device by comparing an image of a commonly depicted object in a first and a second image of said first and said second imaging device respectively, wherein said first and said second imaging devices are configured for providing first and second depth information respectively for said respective images and in which at least said first and said second depth information is used for said determination; and said system further comprising:
   a. a means for determining a set of at least four reference points, said reference points recognizable on said first image and on said second image as projected reference
   b. a means for determining virtual reference points by deriving a virtual position of said reference points with respect to said first imaging device by using said first depth information for the image of said reference points in said first image;
   c. a means for setting a predetermined orientation of said first imaging device;
   d. a means for deriving a position of said second imaging device with respect to said virtual reference points by using said second depth information of the image of said reference points in said second image;
   e. a means for determining the orientation of said second imaging device by optimizing an alignment between the image of said reference points on said second image and the virtual reference points.

11. The system according to according to claim 10, further comprising a means for taking into account intrinsic camera parameters in said determination.

12. The system according to claim 10 further comprising a means for determining a relative position and orientation of more than two imaging devices, by iteratively determining a relative position and orientation of a further imaging device with respect to a first predetermined imaging device.

13. The method according to claim 1, further comprising retrieving a fixed position and orientation of a predetermined number of imaging devices, the images of which are further used for 3-D video conferencing.

* * * * *